Patented Feb. 1, 1949

2,460,600

UNITED STATES PATENT OFFICE 2,460,600

AMINO ALCOHOLS AS SOFTENERS IN BUTADIENE-STYRENE COPOLYMERS

Donald V. Sarbach, Cuyahoga Falls, Ohio, assignor to The B. F. Goodrich Company, New York, N. Y., a corporation of New York No Drawing. Application November 29, 1944, Serial No. 565,809

2 Claims. (Cl. 260—32.6)

This invention relates to a method of vulcanizing butadiene-styrene copolymers, and it has particular reference to the incorporation of an amino alcohol into butadiene-styrene copolymers to improve the properties of plasticity, extensibility, and flex life of the vulcanized butadiene-styrene copolymers.

Materials that modify the physical properties of rubber and rubber-like products in this manner are known as softeners. It is advantageous to employ softeners in the compounding of rubbery materials, for the softeners make the unvulcanized material more plastic and thus reduce the time and power consumed in compounding. Also, since softeners modify the physical properties of the vulcanized product, any hardening effect of various compounding ingredients may be offset by the use of these softeners.

Softeners may be of many types depending on their source, such as petroleum by-products, coal tar by-products, rosins, resins, animal and vegetable oils and fatty acids, and miscellaneous organic chemicals.

According to my invention there is incorporated into butadiene-styrene copolymers an amino alcohol which acts as a softening agent.

The action of the amino alcohol is two fold when incorporated into unvulcanized butadiene-styrene copolymers. Part of the amino alcohol forms an amino salt of the excess fatty acid present from the process of coagulation of the copolymers, said amino-fatty acid salts act as wetting agents which markedly assist in the pigment dispersion during compounding of the unvulcanized copolymers. The remaining amino alcohol at the same time, makes the copolymers more plastic which reduces the time and power consumed during compounding.

Amino alcohols also accelerate vulcanization. In fact, when 10 to 20 parts by weight of an amino alcohol are incorporated into 100 parts of butadiene-styrene copolymer, an optimum vulcanization period of ⅓ to ¼ of the normal vulcanization period is achieved. It has also been found that the presence of an amino alcohol during vulcanization causes partial reversion in the case of long cures which is beneficial in preventing over-vulcanization and helpful in producing a more uniformly vulcanized product.

Vulcanized butadiene-styrene copolymers containing amino alcohols experience very slight changes in tensile strength with an increase in the time of vulcanization, but experience an increase in extensibility with an increase in vulcanization time which is peculiar to these softeners. There is also some improvement in the flex life of the vulcanized product.

Since the presence of 10 or more parts of amino alcohol accelerates the vulcanization to such an extent as to produce an optimum cure in such a short time as to be unsatisfactory in some cases, it will sometimes be preferred to add substantially one-half to about 5 parts of amino alcohol in combination with other softeners, which will be found to impart the same beneficial effects on the unvulcanized and vulcanized butadiene-styrene copolymers.

The following are examples of the types of amino alcohols that can be used: monoethanolamino, diethanolamine, triethanolamine, phenyl diethanolamine, diethylamino ethanol, and di-n-butylamino ethanol.

The following examples are indicative of the results to be expected from the use of amino alcohols as softeners in butadiene-styrene copolymers. The properties of the vulcanized compounds given, are for various times of vulcanization, but all were vulcanized at 280° F.

The data listed for the various physical properties have been obtained from standardized tests for these physical properties. For brevity of tabulating, Shore A durometer hardness is listed as hardness; plasticity as the value obtained at the temperature noted from the Goodrich Plastometer using a 5 pound weight; crescent tear listed as tear in lb./0.01" thickness; and hysteresis as determined by the Goodrich Flexometer with rapid cyclic compression, 17½% stroke and 55 pound weight (see E. T. Lessig, Ind. & Eng. Chem., Anal. Ed., vol. 9, p. 582, 1937) is expressed in degrees Fahrenheit rise above 212° F.; flex life determined by a vertical De Mattia machine in a constant temperature room at 82° F. and 45% relative humidity listed as flex life.

The data in Table I indicate the results to be expected from the use of 10 parts of amino alcohol in the following base recipe:

|  | Parts |
|---|---|
| Butadiene-styrene copolymer | 100 |
| Reinforcing carbon black | 45 |
| Zinc oxide | 5 |
| Antioxidant | 1 |
| Sulfur | 1.75 |
| Vulcanization accelerator | 1.5 |
| Amino alcohol indicated | 10 |

Table I

| Vulcanization time—minutes | Example 1 No Amino Alcohol | | | Example 2 10 pts. Triethanolamine | | | Example 3 10 pts. Phenyl diethanolamine | | |
|---|---|---|---|---|---|---|---|---|---|
| | 300% Modulus, p. s. i. | Ultimate Tensile Strength, p. s. i. | Percent Elongation | 300% Modulus, p. s. i. | Ultimate Tensile Strength, p. s. i. | Percent Elongation | 300% Modulus, p. s. i. | Ultimate Tensile Strength, p. s. i. | Percent Elongation |
| 15 | Break only | 2,500 | 675 | 600 | 2,225 | 595 | 975 | 2,400 | 510 |
| 30 | 1,150 | 2,500 | 450 | 625 | 2,375 | 600 | 1,025 | 2,525 | 500 |
| 45 | 1,350 | 2,300 | 400 | 675 | 2,400 | 600 | 1,075 | 2,525 | 500 |
| 75 | 1,500 | 2,200 | 360 | 725 | 2,450 | 575 | 1,075 | 1,950 | 425 |
| 150 | 1,650 | 2,100 | 310 | 725 | 2,200 | 560 | 1,025 | 2,450 | 490 |
| Hardness 30'+45' | 63 | 65 | | 60 | 60 | | 58 | 59 | |
| Plasticity: 35° C | | 3.8 | | | 7.9 | | | 4.0 | |
| 85° C | | 24.0 | | | 36.3 | | | 48.7 | |
| Tear Room temp | 27 | 27 | | 24.9 | 22.0 | | 24.2 | 24.1 | |
| Hysteresis: 30' | | 43° rise | | | 68° rise | | | 42° rise | |
| 45' | | 42° rise | | | 67° rise | | | 42° rise | |
| Flex life | | 45,000 cycles | | | 190,000 cycles | | | 140,000 cycles | |

It is apparent from the data from the above examples that the use of an amino alcohol with butadiene-styrene copolymers tends to keep the tensile strength and percentage elongation substantially constant with increase time of vulcanization. It is also to be noted that the plasticity of 85° C. increases with the use of an amino alcohol as does the flex life. Phenyl diethanolamine is a solid and would not be expected to show any softening properties at 35° C., but, at temperatures approaching mill temperatures, this material does increase the plasticity of the composition. This is shown in the above table.

The advantages of the use of amino alcohols can be retained by employing them in lesser amounts than given in the above examples, but, when a lesser amount is used, other softeners are generally used in combination with the amino alcohols to modify the physical properties as desired. The supplemental softeners are selected according to their ability to modify certain physical properties. It is often necessary to use a combination of two or more softening agents to achieve the desired results.

The following examples in Tables II and III indicate the results to be expected from the use of lesser quantities of amino alcohols than previously described. The base recipe given below contains a combination of softening agents. These softening agents are known to the art.

Base recipe for Tables II and III:

| | Parts |
|---|---|
| Butadiene-styrene copolymers | 100 |
| Sulfur | 3.0 |
| ZnO | 3.0 |
| Channel black | 30 |
| Combination of rosin and oil softener | 10 |
| Vulcanization accelerator | 1.8 |
| Amino alcohol (triethanolamine) as indicated | |

Table II

| Vulcanization time-minutes | Example 4 No Amino Alcohol | | | Example 5 0.25 parts Triethanolamine | | |
|---|---|---|---|---|---|---|
| | 300% Modulus p. s. i. | Ultimate Tensile Strength p. s. i. | Percent Elongation | 300% Modulus p. s. i. | Ultimate Tensile Strength, p. s. i. | Percent Elongation |
| 15 | | | | | 450 | 860 |
| 30 | | 600 | 680 | 400 | 800 | 500 |
| 45 | 200 | 600 | 510 | 550 | 700 | 300 |
| 75 | 350 | 600 | 400 | 650 | 650 | 300 |
| 150 | 450 | 600 | 280 | | 750 | 290 |
| Hysteresis: 30' | | 67 | | | 45 | |
| 45' | | 41 | | | 35 | |

Table III

| Vulcanization time-minutes | Example 6 0.5 pt. of Triethanolamine | | | Example 7 1.0 pt. of Triethanolamine | | |
|---|---|---|---|---|---|---|
| | 300% Modulus p. s. i. | Ultimate Tensile Strength, p. s. i. | Percent Elongation | 300% Modulus p. s. i. | Ultimate Tensile Strength p. s. i. | Percent Elongation |
| 15 | | 700 | 750 | 500 | 1,000 | 440 |
| 30 | 200 | 800 | 400 | 650 | 800 | 330 |
| 45 | 500 | 700 | 320 | 800 | 800 | 310 |
| 75 | 650 | 700 | 290 | | 750 | 280 |
| 150 | | 700 | 280 | | 800 | 290 |
| Hysterisis: 30' | | 34 | | | 30 | |
| 45' | | 29 | | | 39 | |

The time for optimum vulcanization for a compounded copolymer stock of this type is 30 to 45 minutes, but it is evident from the above data that overcuring as much as 300%, in regard to time, does not affect the physical properties of the vulcanized product as long as an amino alcohol is present even in small amounts.

The use of channel black is generally avoided where high hysteresis is undesirable, but, comparing the hysteresis data of Example 4 with the hysteresis data of Examples 5, 6 and 7, it is evident that channel black may be used with amino alcohols without imparting the usual undesirable high hysteresis characteristics. Thus more expensive materials may be replaced by more readily available materials which would impart some undesirable modifications to the properties of hardness, tensile strength, extensibility, plasticity and hysteresis of vulcanized butadiene-styrene copolymers which could be offset by the use of small amounts of an amino alcohol.

The accelerating effect of the amino alcohols can be compensated for by proper adjustment of the ratio of sulfur to vulcanization accelerator so that amino alcohols can be used in any desired amount from substantially 0.25 part by weight to 20.0 parts by weight to obtain the desired degree of modification of the physical properties or the processing properties of vulcanized or unvulcanized butadiene-styrene copolymers.

The adjustment of the sulfur-accelerator ratio to increase or decrease the rapidity of vulcanization is known to the art.

Although I have described herein specific embodiments of my invention by means of examples, I do not intend to limit myself solely thereto, but to include all of the obvious variations and modifications and equivalents falling within the spirit and scope of the claims.

I claim:

1. A plastic unvulcanized synthetic rubber composition comprising a copolymer of butadiene and styrene and as the sole softening and plasticizing agent, 10 to 20 parts by weight of triethanolamine for each 100 parts by weight of the copolymer.

2. A synthetic rubber vulcanizate prepared by heating the composition of claim 1 in the presence of sulfur and a sulfur vulcanization accelerator for a time sufficient to bring about vulcanization.

DONALD V. SARBACH.

REFERENCES CITED

The following references are of record in the file of this patent:

UNITED STATES PATENTS

| Number | Name | Date |
|---|---|---|
| 1,081,614 | Hoffmann | Dec. 16, 1913 |
| 2,234,204 | Starkweather | Mar. 11, 1941 |
| 2,300,607 | Zaucker | Nov. 3, 1942 |
| 2,325,947 | Garvey | Aug. 3, 1943 |
| 2,349,733 | Howland | Mar. 23, 1944 |